(12) United States Patent
Miller et al.

(10) Patent No.: US 9,734,682 B2
(45) Date of Patent: Aug. 15, 2017

(54) ASSET MANAGEMENT USING AN ASSET TAG DEVICE

(71) Applicant: Enovate Medical, LLC, Murfreesboro, TN (US)

(72) Inventors: David R. Miller, Morgan, UT (US); Arlow Farrell, Murfreesboro, TN (US)

( * ) Notice: Subject to any disclaimer, the term of this patent is extended or adjusted under 35 U.S.C. 154(b) by 0 days.

(21) Appl. No.: 14/961,509

(22) Filed: Dec. 7, 2015

(65) Prior Publication Data

US 2016/0260301 A1    Sep. 8, 2016

Related U.S. Application Data

(60) Provisional application No. 62/127,211, filed on Mar. 2, 2015, provisional application No. 62/146,084, filed on Apr. 10, 2015.

(51) Int. Cl.

| | |
|---|---|
| *G08B 13/14* | (2006.01) |
| *G08B 13/24* | (2006.01) |
| *G06Q 10/08* | (2012.01) |
| *H04B 5/00* | (2006.01) |
| *G06K 7/00* | (2006.01) |

(52) U.S. Cl.
CPC ....... *G08B 13/2417* (2013.01); *G06K 7/0008* (2013.01); *G06Q 10/087* (2013.01); *H04B 5/0062* (2013.01)

(58) Field of Classification Search
CPC .. G06K 7/0008; G06K 17/00; G06K 17/0022; G06Q 10/087; G06Q 10/0875; G08B 13/2417

USPC ..................... 340/572.1, 10.1, 5.92; 235/375
See application file for complete search history.

(56) References Cited

U.S. PATENT DOCUMENTS

| | | | |
|---|---|---|---|
| 6,961,448 B2 | 11/2005 | Nichols et al. | |
| 7,497,370 B2* | 3/2009 | Allen ................. | G06Q 10/0875 235/375 |
| 8,378,815 B1 | 2/2013 | McNulty et al. | |
| 9,064,225 B2 | 6/2015 | Nakra et al. | |
| 2002/0194500 A1 | 12/2002 | Bajkar | |
| 2005/0062603 A1 | 3/2005 | Fuerst et al. | |

(Continued)

OTHER PUBLICATIONS

Gatekeeper, "Protect Your Privacy", Feb. 18, 2015, Untethered Labs, Inc., 5000 College Avenue, College Park, MD, 20740, U.S.A. www.gkchain.com.

(Continued)

*Primary Examiner* — John A Tweel, Jr.
(74) *Attorney, Agent, or Firm* — Waller Lansden Dortch & Davis, LLP

(57) ABSTRACT

An asset tag device including a housing, a battery disposed within the housing, a circuit board disposed within the housing and in electrical communication with the battery. The circuit board includes a local memory, a transceiver to detect local signals and transmit a response packet, and a processor. The processor to identify the detected local signals, determine whether the detected local signals include at least one beacon signal, store, to the local memory, the at least one beacon signal, sort, in the local memory, the stored at least one beacon signal by proximity to the asset tag device, parse the sorted at least one beacon signal, and append tag information to the parsed at least one beacon signal to generate the response packet.

14 Claims, 7 Drawing Sheets

(56) References Cited

U.S. PATENT DOCUMENTS

2006/0145815 A1\* 7/2006 Lanzieri ............... G06K 7/0008
340/572.1
2009/0315735 A1 12/2009 Bhavani et al.

OTHER PUBLICATIONS

Chris Hoffman, "How to Unlock Your Computer with Your Phone or Watch", Jul. 24, 2015, How-To Geek, LLC, Herndon, VA, U.S.A. http://www.howtogeek.corn/222924/how-to-unlock-your-computer-with-your-phone-or-watch/.

Krohn, et al., "Best Practices From the Mobile Frontier", mHealth Innovation, 2014, p. 10, Healthcare Information and Management Systems Society (HIMSS), 33 West Monroe Street, Suite 1700, Chicago, IL 60603-5616. https://books.google.com/.

Lindh, Joakim, "The key to using Bluetooth Smart in asset tracking", Jan. 5, 2015, Electronic Component News (ECN), U.S.A. http://www.ecnmag.com/blog/2015/01/key-using-bluetooth-smart-asset-tracking.

openbeacon.org, "About the OpenBeacon project", Oct. 16, 2014. http://get.openbeacon.org/about.html, Berlin.

Weber, Joanna, "Smart Asset Management—Beacons as a Tracking Solution", Jul. 23, 2015, Minodes GmbH, 137 Varick Street, 2nd Floor, New York, NY 10013, U.S.A. https://www.minodes.com/blog/smart-asset-management.

SPREO.CO, "Indoor Navigation & Positioning Technology", Sep. 18, 2015, SPREO Indoor Location Solutions, 902 Broadway, Fl 6, New York, NY 10010, U.S.A. http://spreo.co/technology/bluetooth-asset-tracking-technology/.

Centrak, "Innovation Products", Feb. 27, 2015, CenTrak Inc., 125 Pheasant Run, Newtown, PA 18940, U.S.A. http://www.centrak.com/products/.

Centrak, "Innovation Clinical-Grade Visibility", Feb. 27, 2015, CenTrak Inc., 125 Pheasant Run, Newtown, PA 18940, U.S.A. http://www.centrak.com/clinilcal-grade-locating/.

Centrak, "Innovation Multi-Mode Technology", Feb. 27, 2015, CenTrak Inc., 125 Pheasant Run, Newtown, PA 18940, U.S.A. http://www.centrak.com/multi-mode-tech/.

Quuppa, "Unique Technology," Feb. 19, 2015, Quuppa Oy, Keilaranta 1, 02150 Espoo, Finland. http://quuppa.com/technology/.

Quuppa, "Key Features," Feb. 19, 2015, Quuppa Oy, Keilaranta 1, 02150 Espoo, Finland. http://quuppa.com/features/.

Cardinal Health, "Effective inventory management is about much more than keeping the shelves stocked," Cardinal Health Inventory Management Solutions, Sep. 9, 2015, Cardinal Health, 7000 Cardinal Place, Dublin, OH 43017, U.S.A. http://www.cardinalhealth.com/en/services/acute/business-solutions/operational-solutions/inventory-management-services/cardinal-health-inventory-management-solutions.html.

\* cited by examiner

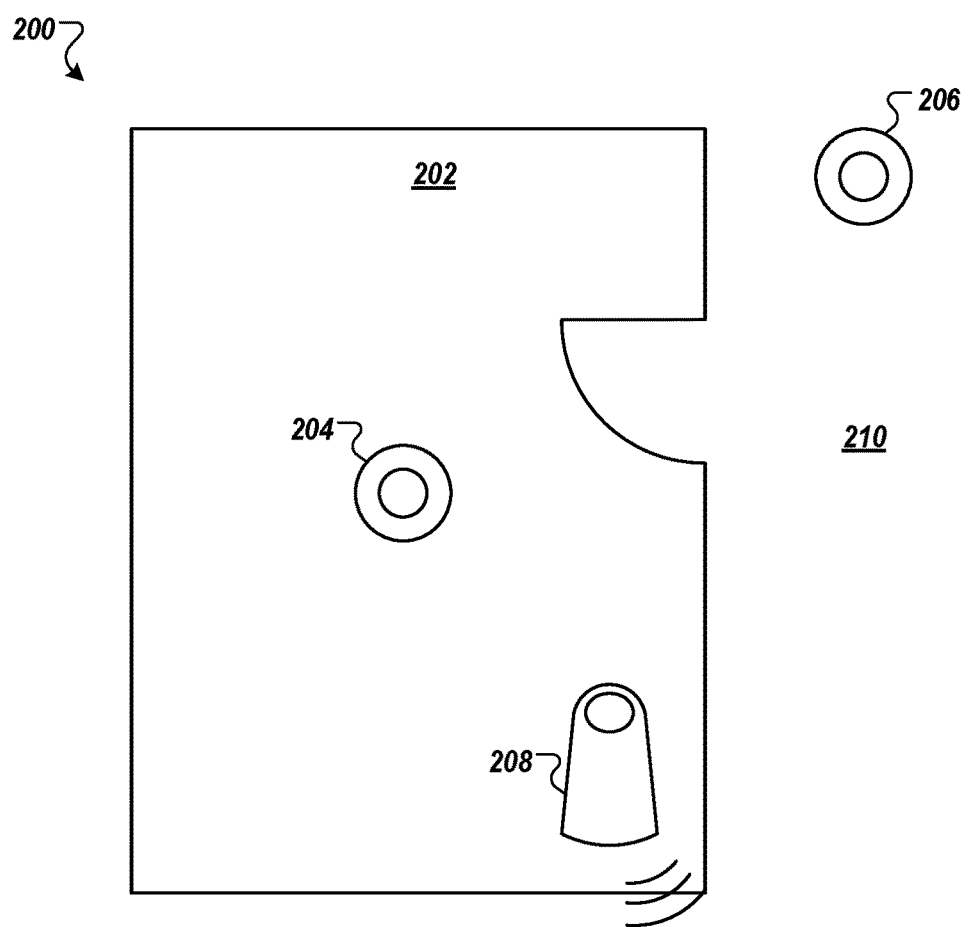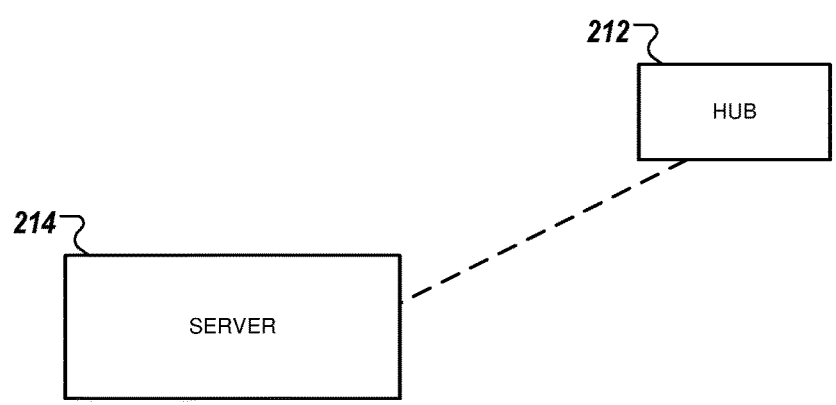
FIG. 2

Beacon Advertisement Packet Structure

| BYTE | DESCRIPTION | NOTE |
| --- | --- | --- |
| 0 | Length in this profile | 0x02 |
| 1 | Type/Assigned Number | 0x01 = Flag |
| 2 | Flag: BR/EDR not supported | 0x04 = BLE_GAP_ADV_FLAG_BR_EDR_NOT_SUPPORTED |
| 3 | Length in this profile | 0x06 |
| 4 | Type/Assigned Number | 0x09 = Name |
| 5 to 9 | Application Name | "EmTag" |
| 10 | Length in this profile | 0x13 |
| 11 | Type/Assigned Number | 0xFF = Manufacturer data |
| 12 to 13 | Nordic Semiconductor ID | 0x59, 0x00 |
| 14 to 15 | Advertisement indicator | 0x02, 0x15 |
| 16 to 17 | First closest Minor ID | 2 bytes, changes based on detected beacons. |
| 18 | First closest RSSI | Radio strength received |
| 19 to 20 | Second closest Minor ID | 2 bytes, changes based on detected beacons. |
| 21 | Second closest RSSI | Radios strength received |
| 22 to 24 | Padding | 0x00, 0x00, 0x00 |
| 25 to 26 | This device's Major ID | Default = 0x0480 or 1152 |
| 27 to 28 | This device's Minor ID | Default = 0x03E9 or 1001 |
| 29 | This device's TX Power level | Default = 0dBm (0x00) |

FIG. 4

ASSET MANAGEMENT USING AN ASSET TAG DEVICE

RELATED APPLICATIONS

This application claims the benefit of U.S. Provisional Application No. 62/127,211, filed Mar. 2, 2015 and U.S. Provisional Application No. 62/146,084, filed Apr. 10, 2015, the entire contents of which are incorporated by reference.

BACKGROUND

As a company grows, a number of assets a company manages may increase. For example, with growth the company may increase its inventory, personnel, tools, vehicles, buildings, real estate, equipment, and so forth. Additionally, as a number of personal devices such as computers, cellphones, tablets, and so forth used by employees, contractors, and customers continue to increase, management of assets used and/or owned by a company can become increasingly difficult to track.

BRIEF DESCRIPTION OF THE DRAWINGS

The disclosure can be understood more fully from the detailed description given below and from the accompanying drawings of various examples of the disclosure. The drawings, however, should not be taken to limit the disclosure to the specific examples, but are for explanation and understanding only.

FIG. 2 illustrates a diagram an AMS in communication with a hub or server according to one embodiment.

FIG. 4 illustrates one embodiment of a broadcast of a beacon.

DETAILED DESCRIPTION

Figure 1:
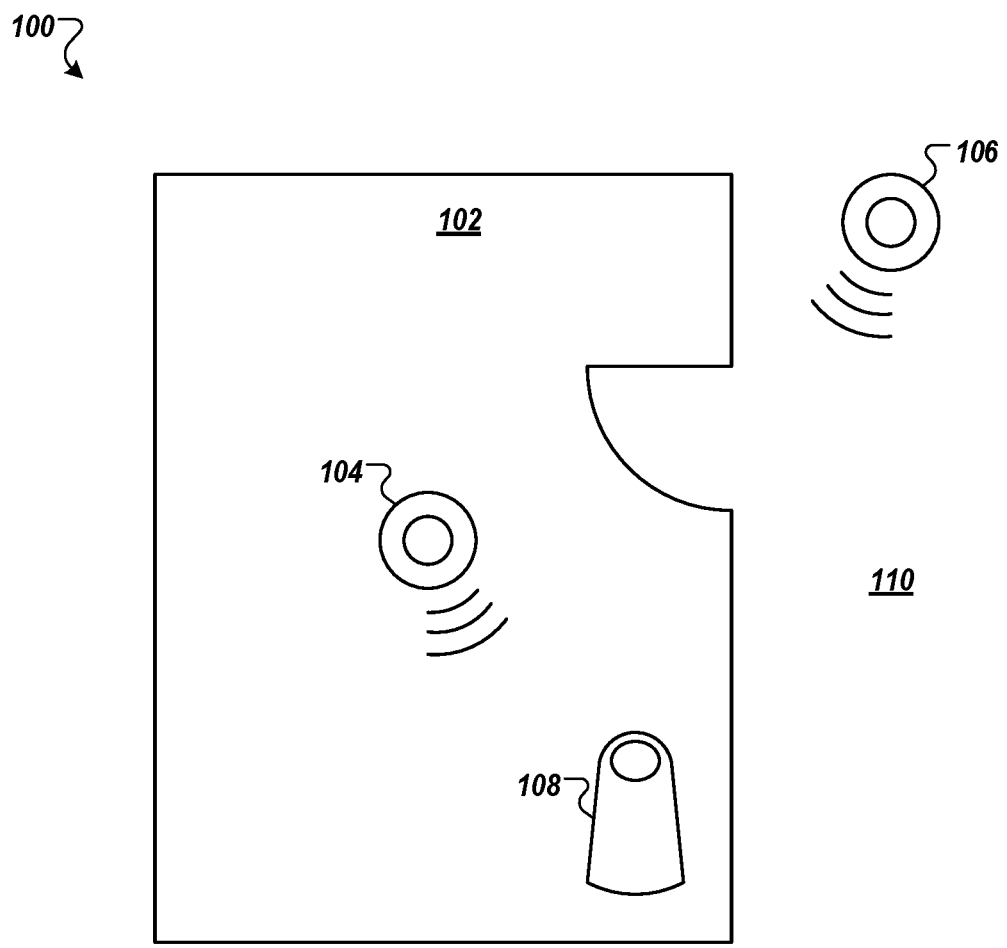
FIG. 1 illustrates a diagram of one embodiment of an asset management system (AMS) for asset tracking and management according to one embodiment.

Tracking and managing assets or objects of a large-scale enterprise can be a formidable task. Traditionally, asset tracking and management can be done using a manual inventory system that can use paperwork to track the movement of the assets or usage of the assets. For example, when an employee checks out equipment, the employee can write down the time the asset was checked out and the time that the asset was checked back in. However, the manual paperwork system for tracking and managing assets can be time-intensive and can introduce a variety of errors. For example, an employee may forget to write down when they checked an asset in or out, fail to return an asset, lie about equipment usage, and so forth.

Electronic asset tracking systems (ATS) can be used to decrease the time-intensiveness and errors associated with manual paperwork systems. For example, an ATS can use barcode labels or radio frequency identification (RFID) tags to track assets. The barcode labels or RFID tags can be attached to each asset and when the asset is checked in or out, the user can scan the barcode label or RFID tag using a scanner. However, a barcode label or an RFID tag may still demand a user to manually scan an asset to track information. For example, a barcode label or RFID tag typically require either movement of assets past scanners (e.g., palettes leaving a warehouse or airline passengers moving past a magnetic detector) or employees walking around a facility to verify manually that the data matches the records (e.g., stock takes). Collection of asset information using a traditional ATS can be difficult. For example, equipment that is on a floor, under desks, behind monitors, and so forth, can have a barcode label or an RFID tags in inconvenient or hard to find locations. Additionally, these techniques can physically locate the asset and can require personnel to physically collect the asset information. Use of manual scanners can be slow and impractical for many environments.

Additionally, traditional ATS fails to provide meaningful information to a user of the ATS. For example, the scanning of a barcode label or an RFID tag provides a user with a time of when an asset was used or checked out or can verify an identity of the asset but fails to provide asset information such as asset usage, warranty information, problems with the asset, location of the asset, and so forth.

Aspects of the present disclosure address the above noted deficiency by providing an asset management system (AMS) that can track a location of the asset and determine asset information. Assets in the asset management system can communicate management and tracking information to a hub or server of the system. The system can analyze the management and tracking information to determine selected information and/or display the management and tracking information to a user to enable management of the assets. Additionally, the asset management system can provide the management information to a user in real-time and/or monitor the assets to determine when events or conditions occur. One advantage of the asset management system can be to provide asset tracking and management information to a user while decreasing the time-intensity and error level of the information. Another advantage of the AMS can be to provide the information to a user without physically locating the asset and manually determining the information. For example, when a system administrator desires to locate an asset or determine a usage of the asset, the AMS can determine the information and provide it to the user without the user physically having to locate the asset, determine the identification of the asset, and manually determine the information. Another advantage of the AMS can be to provide historical or trending information of the asset, such as asset usage, power consumption, and so forth. Another advantage of the AMS can be to track information that may not practically be manually tracked. In one example, manually tracking a path that an asset (such as a vehicle or cart) may be used along on a routine basis may not practical. In another example, improper usage of an asset, such as warranty voiding usage, may not be practically tracked, as the individual using the asset in an improper way is not likely to report the usage.

In one example, the asset data and/or the management data can include: asset usage data; asset location data (such as when the asset is moved, how far the asset is moved, real-time tracking information); asset warranty information; asset battery life data; asset type information; charge level data; device utilization data; and so forth.

Additionally, the AMS can provide tracking and management information for personnel. For example, employees, contractors, customers, and so forth may carry a tag device so that their movements and relative locations may be tracked. This may assist in locating a person or directing a person to a specific location. For example, if a doctor is needed in an emergency situation, that doctor may be located within a medical facility. Additionally, information regarding relative locations of personnel and equipment provides other benefits.

FIG. 1 illustrates a diagram of one embodiment of an asset management system (AMS) 100 for asset tracking and management according to one embodiment. In the illustrated example, the AMS 100 includes a first beacon 104 and a second beacon 106. The first beacon 104 is shown as centrally located at a location, such as a room 110 or other associated location. The illustrated first beacon 104 can be a hardware device, such as a coin cell powered beacon. The first beacon 104 may include a circuit board within a housing, the circuit board likely containing a processor (or discrete logic or controller or microcontroller), memory (potentially non-volatile and/or volatile memory), a battery, and a transceiver (mostly just transmits). The first beacon is typically programmed to transmit a beacon signal containing data to identify the first beacon to other devices, including a tag 108 or a tag manager running on a host machine.

In one example, the first beacon 104 can broadcast location information to one or more devices located within a threshold radius of the associated location. In another example, the first beacon 104 can continuously broadcast the location information. An advantage of broadcasting the location information on a continuous basis can be to provide the location information to devices upon the device entering the associated radius (e.g., reducing or eliminating lag time for the asset tag to determine the location of the device). In another example, the first beacon 104 can broadcast the location information on a periodic basis. An advantage of broadcasting the location information on a periodic basis can be to reduce power consumption of the location ID beacon by communicating the location information less frequently.

In one example, the first beacon 104 may include an active radio frequency identification device (RFID), a passive RFID, an infrared device, a motion sensor, a sonar or sonic device, and/or a near field communication (NFC) device. In this example the first beacon 104 can be a checkpoint used to determine when an asset passes or otherwise enters the threshold of the first beacon 104.

In one example, the first beacon 104 may be a low energy device such as a Bluetooth Low Energy (BLE) device. The first beacon 104 may operate in a non-connectable advertisement mode, e.g., where the location information from the first beacon 104 can be contained in the advertisement. In another example, the first beacon 104 can establish communications connections with other devices. For example, the first beacon 104 may establish a communications connection with a device to receive firmware and/or software updates.

In one example, the first beacon 104 may format beacons using a fixed advertisement format. In another example, the first beacon 104 can include device identifiers.

In one example, the first beacon 104 can use BLE advertisements for a one-way discovery mechanism. In this example, the first beacon 104 can transmit packets of data in at selected intervals, such as from 20 milliseconds (ms) to 10 seconds. In one example, the location ID beacon can adjust the selected interval based on a location of the location ID beacon and/or a battery level remaining of the beacon. For example, as the interval between broadcasting decreases (e.g., the location ID beacon sends out an increased number of beacons), a battery life of the first beacon 104 may decrease and assets searching for beacons may receive the beacons faster. In one example, as a battery life of the first beacon 104 decreases, the interval between broadcasting beacons may increase (e.g., the beacon can send fewer beacons). In another example, when the first beacon 104 determines that it is located in a select location, the first beacon 104 can increase or decrease an interval between sending broadcasts. For example, when the first beacon 104 is located in a high traffic area with a relatively large amount of devices coming within range, the first beacon 104 can decrease an interval between sending beacons as a relatively large amount of devices may receive the broadcasts. In another example, when the first beacon 104 is located in a low traffic area with a relatively small amount of devices coming within range of the first beacon 104, the first beacon 104 can increase an interval between sending broadcasts as fewer devices may receive the broadcast.

A second beacon 106 is shown as located in a second location such as a different room or a hallway 110. The second beacon 106 may also be located at a separate location within the room 110 with the first beacon 104. The first and second beacons 104 and 106 may be attached to ceilings or walls or placed in a storage location such as a drawer, cabinet, or shelf. Alternatively, the beacons 104 and 106 may be stored in conjunction with specialized structures for facilitating a specific signal range, integrity, or other signal attributes, or to provide security or power for the beacons 104 and 106 or other functions.

The AMS 100 also includes a tag device 108. The tag device may be a physical device which includes a physical housing, an electrical power supply such as a battery, a circuit board or other control system with a memory, a transceiver, and a processor. In one embodiment, the tag 108 can enter the room 110 and detect local broadcast signals. The tag 108 may detect a variety of different signals. For example, the tag 108 may detect signals from the first beacon 104 and the second beacon 106. The tag 108 may also detect signals from other tags like itself. The tag 108 may also detect signals from other devices or electronic equipment. In one embodiment, the tag 108 is capable of differentiating beacon signals from other signals. The tag 108 may ignore or discard information from the other signals.

In the depicted embodiment, the tag 108 may receive information from one or both of the beacons 104 and 106. If the tag 108 is nearer the first beacon 104, the information signal from the first beacon 104 may be detected as the stronger signal. The tag 108 may record the detected signal strength. Similarly, the tag 108 may detect an information signal from the second beacon 106 and record the signal strength of the second beacon 106. The tag may then sort the information from the beacons 104 and 106 by strength.

In some embodiments, the tag 108 may parse the sorted information to identify a major ID and a minor ID. The tag 108 may store the parsed IDs in local memory. The local memory may be a non-volatile memory.

In one example, a tag 108 can be coupled to an asset. In one example, the asset tag can communicate with the asset to retrieve information from the asset. The tag 108 may also return information to one or both of the first and second beacons 104 and 106. In another example, the tag 108 can relay information between the asset and a communication hub (described below with reference to FIG. 2). In another example the asset tag 108 may include software registered or installed on an asset.

In another embodiment, the tag 108 can be coupled to an individual, such as medical personnel in a hospital. For example, the tag 108 can be attached to or integrated into a wristband or watch that can be worn by the individual (such as a medical personnel or patient) and can communicate location information and other information relating to the personnel.

The tag 108 may include a communication module for communicating information. In one example, the communication module can communicate the data using a cellular network and/or a wireless network. In one example, the communications network can be a cellular network that may be a third generation partnership project (3GPP®) release 8, 9, 10, 11, or 12 or Institute of Electronics and Electrical Engineers (IEEE®) 802.16p, 802.16n, 802.16m-2011, 802.16h-2010, 802.16j-2009, 802.16-2009. In another example, the communications network can be a wireless network (such as a wireless fidelity (Wi-Fi®) network) that may follow a standard such as the IEEE 802.11-2012, IEEE 802.11ac, or IEEE 802.11ad standard. In another embodiment, the communications network can be a Bluetooth® connection such as Bluetooth v1.0, Bluetooth v2.0, Bluetooth v3.0, or Bluetooth v4.0. In another embodiment, the communications network can be a Zigbee® connection such as IEEE 802.15.4-2003 (Zigbee 2003), IEEE 802.15.4-2006 (Zigbee 2006), IEEE 802.15.4-2007 (Zigbee Pro).

In one example, the beacons 104 and 106 and/or the tag 108 can communicate location information and/or asset information using dual mode Bluetooth® technology. In another example, the location information and/or asset information can be formatted to provide Bluetooth communication service packet formatted to be universal across different platforms and devices.

In one example, the tag 108 can switch between a broadcast or advertising mode and a scanning mode. In a broadcast mode the tag 108 can communicate outgoing information such as a tag signal. In a scanning mode the tag 108 can scan for beacons 104 and 106 to determine the location of the tag 108. In another example, the tag 108 can initially be in a scan mode to scan for a beacon 104. When the tag 108 locates a beacon 104, the tag 108 can communicate with the beacon 104 to receive beacon information. In one example, the beacon 104 can broadcast out the beacon information and when the tag 108 is with a broadcast range of the beacon 104, the tag can receive the beacon information signal. In another example, the tag 108 can communicate with the beacon 104 to request the beacon information. When the tag 108 receives the beacon information, the tag 108 can switch from the scan mode to the broadcast mode. When the tag 108 is in a broadcast mode, the tag 108 can communicate asset location data and/or management data to a communication hub (described in more detail below). In one example, the tag 108 can append a location ID received during scanning mode to the asset location data and/or management data to identify the device, personnel, or other asset that the asset data and/or management data is associated with. In another example, the tag 108 can scan for other devices in the scan mode and communicate with other devices in the broadcast mode.

The tag 108 can receive broadcast signals from multiple beacons 104 and 106. In one example, the tag 108 can determine the location of the tag 108 and an associated asset 104 by selecting the signal from the beacon with the highest signal strength. An advantage of using the signal from the beacon with the highest signal strength is to filter out signals received from beacons in other locations, e.g., filter out the signal leakage from other beacons not near the tag 108.

In another example, the tag 108 can determine the location of the tag 108 and/or the associated asset by aggregating or combining signals from the different beacons such as first and second beacons 104 and 106. For example, the tag can sort signals based on the signal strength of the broadcast signal from the beacons 104 and 106. In another example, the tag 108 can triangulate the location of the tag 108 and/or the associated asset by parsing a major and minor ID from each of the different signals from the first and second beacons 104 and 106. An advantage of using signals from both beacons 104 and 106 can be when the signal strength of the beacons 104 and 106 are weak the tag 108 can use the multiple signals to increase an accuracy of a location determination.

FIG. 2 illustrates a diagram of an AMS in communication with a hub or server according to one embodiment. The illustrated embodiment illustrates a tag 208 to relay tag information to a hub 212. The hub 212 further communicates with a server 214. The tag 208 receives the signals from the first beacon 204 and the second beacon 206. Because the tag 208 is currently located in the room 202 and closer to the first beacon 204, the detected signal from the first beacon 204 is stronger than the detected signal from the second beacon 206. The tag 208 may sort the detected signals by signal strength and store them.

The tag 208 sorts the signals and parses them to extract a major ID and a minor ID from each signal. The tag 208 generates a tag signal or response packet which includes the parsed major and minor IDs. The tag signal may also include a signal strength component, a beacon identifier component, an asset identifier component, a tag identifier component, a beacon status component, a tag status component, an asset status component, a time stamp component, or other components. For example, the tag 208 may relay battery or power level information for the beacons 204 and 206 or for the tag 208 itself. Other embodiments may include fewer or more pieces of information in the tag signal or response packet.

The illustrated embodiment of the hub 212 of the AMS 200 receives the tag signal from the tag 208. In the illustrated embodiment, the hub 212 transmits information to the server 214. In some embodiments, the hub 212 may modify the tag signal to include or remove information from the signal. For example, the hub 212 may reformat the signal to facilitate a certain type of signal package or format or to facilitate receipt or interpretation by the server 214 or another device. The hub 212 may also apply a timestamp or other hub-unique information to the signal before transmission. The hub 212 may receive or transmit information over a private or shared network. The transmissions may be secured or unsecured. In some embodiments, the hub 212 may store tag signals from a plurality of tags and transmit the signals in a group package. Other transmission schemes may include transmitting upon receipt, based on a time schedule, or a number of received signals, or other criteria. In some embodiments, the hub 212 is connected to an AC power supply such as a local grid or a DC supply.

The ASM system can include repeaters to receive information from one or more assets and relay the information to a communication hub. The repeaters can be configured as a network of repeaters, such as nodes in a piconet, for a location. For example, a hospital can have multiple repeaters located at different locations in the hospital. The repeaters can receive information from an asset tag or location ID beacon and relay the information to the communication hub. In one example, the repeater can relay the information directly to the communication hub. In another example, the repeater can indirectly relay the information via one or more other repeaters to a communication hub.

BLE/Wi-Fi Repeater

The hub 212 can include a first antenna configured to communicate using a cellular network and a second antenna configured to communicate using a local area network (LAN) or a personal area network (PAN), such as BLE or Wi-Fi®. In one example, the first antenna may be separated by a threshold distance from the second antenna to reduce or eliminate interference between the first and second antennas. In another example, the first and second antennas can be separated by the threshold distance to enable the first antenna and/or the second antenna to transmit and/or receive information at an increased signal strength.

A bandwidth of the hub 212 to communicate data with the other electronic device (such as server 214) may be limited. In one example, the hub 212 can determine a priority level of information and communicate information based on the priority level of the data. For example, the hub 212 may have a bandwidth of 10 bits per second (bps) when communicating data via the cellular communication channel. In this example, the hub 212 can store received information from the repeaters, the beacons 204 and 206, and/or the tag 208 and communicate the information via the cellular communication channel based on the priority level of the information.

In one example, the hub 212 can indirectly communicate information with devices, beacons, and/or tags via an intermediate device such as a repeater. In another example, the hub 212 can directly communicate information with other devices, beacons, and/or tags.

In one example, the communication hub 212 can relay asset information and management information received from the tag 208 to the server 214. In one example, the hub 212 can receive power from a wall outlet. In another example, the hub 212 can receive power from a wireless power induction charging system.

In one example, the hub 212 can provide a secure private network for devices to communicate with the hub 212. In one example, the hub 212 can provide a secure wireless fidelity (Wi-Fi) Private Wireless Area Network (PWAN) to a device and the devices can communicate information with the hub 212 using the Wi-Fi PWAN. In another example, the hub 212 can communicate information with the tag 208 using a Bluetooth connection. In another example, the hub 212 can use a combination of the Wi-Fi and Bluetooth connections to communicate information with the tag 208. In another example, the hub 212 can be a gateway or access point for the tag 208 to access information stored on the server 214. For example, the hub 212 can be a network switch to enable the tag 208 to access secure information, such as electronic medical records (EMRs), hospital information system (HIS) information, or an active directory of a hospital server.

In one example, hub 212 can be located at selected locations, such as locations in a hospital facility. For example, the hub 212 can be located at select locations in the hospital facility to provide communication coverage throughout the facility. In another example, the hubs 212 can be located at high traffic areas or long routes or paths that the tag 208 may frequently move along. In another example, the locations can be predefined locations selected during the construction of a facility. In another example, the locations can be selected to provide a desired coverage area, such as a floor of a hospital facility.

The hub 212 can include a communication module for communicating information. In one example, the communications module can communicate the data using a cellular network and/or a wireless network. In one example, the communications network can be a cellular network that may be a third generation partnership project (3GPP) release 8, 9, 10, 11, or 12 or Institute of Electronics and Electrical Engineers (IEEE) 802.16p, 802.16n, 802.16m-2011, 802.16h-2010, 802.16j-2009, 802.16-2009. In another example, communications network can be a wireless network (such as a wireless fidelity (Wi-Fi) network) that may follow a standard such as the IEEE 802.11-2012, IEEE 802.11ac, or IEEE 802.11ad standard. In another example, the communications network can be a Bluetooth connection such as Bluetooth v1.0, Bluetooth v2.0, Bluetooth v3.0, or Bluetooth v4.0. In another example, the communications network can be a Zigbee connection such as IEEE 802.15.4-2003 (Zigbee 2003), IEEE 802.15.4-2006 (Zigbee 2006), IEEE 802.15.4-2007 (Zigbee Pro).

In some embodiments, the hub can be configured to receive information via a BLE® communication channel and/or a Wi-Fi® communication channel from repeater and communicate the information to a server via a cellular communication channel or to a cloud-based service. In one example, the communications hub can include a multiband antenna to communicate on the different communication channels. In another example, the communications hub can include multiple antennas configured for communication on different communication channels.

In one example, when the hub receives data, the communication hub can prepare the data for communicating to a server or a cloud-based storage device by: compressing the data, securing the data (such as encrypting the data), and formatting the data for the server or the cloud-based storage device.

In another example, the communication hub can include a network compliance device. The network compliance device can be configured to run an HL7 engine, where the HL7 engine can format information to an HL7 EMR standard. A HL7 interface engine is an interface or integration engine built specifically for the healthcare industry. The HL7 interface engine can connect legacy systems by using a standard messaging protocol. Because hospitals and other healthcare providers may have different systems for different aspects of services, the hospitals and other healthcare providers may be unable to communicate with each other. HL7 can provide a framework for the exchange, integration, sharing and retrieval of electronic health information.

The communication hub can combine a HL7 formatting engine with a communication device to aggregate information received at the communication hub, format the information to an HL7 standard, and communicate the formatted information.

An advantage of combining the HL7 formatting engine with a communication device can be to skip a server that previously had to separately format the information to an HL7 standard. Another advantage can be to avoid storing the information at another location (such as another server) where the information may be formatted to the HL7 format. An advantage of combining the HL7 formatting engine with a communication device can be to decrease a cost of a device to provide HL7 formatted information.

In another example, when the communication hub can communicate the aggregated data to a server or cloud-bases storage device using a cellular communication network.

In one example, when an asset or person with an associated tag 208 comes into a room or moves to a section of a hallway, the tag 208 can communicate that asset and management data to the hub 212. In another example, the asset and management data can include location and identification information relating to the tag 208 and/or the associated asset or personnel. In another example, the asset and management data can include a universally unique identifier (UUID), a major value or identification (ID), and/or a minor value or ID. In one example, the UUID can identify a type of product. For example, when a manufacturer makes a product, the manufacturer may use the UUID to identify a type of product (such as a type of cellphone). In another example, the UUID can be 128 bits. In another example, the major and minor values can be a total of 4 bits. In another example, the major and/or minor bits can be set to uniquely identify a product. For example, the major and/or minor bits can be set to identify a first medical cart with a first unique value and a second medical cart (such as a medical cart that is the same type of product as the first medical cart) with a second unique value. One advantage of using the major and/or minor values to identify different assets can be that the major and minor values can be used across different platforms. For example, the major and minor values can be included in Bluetooth data packets communicated to devices operating using a Windows® platforms, an Android® platforms, and/or an iOS® platforms.

In one example, the major values and/or the minor values can be in a header of a packet. An advantage of the major values and/or the minor values being located in a header of a packet can be to enable multi-platform or operating system compatibility, where different systems can read major values and/or the minor values in the header. Another advantage of the major values and/or the minor values being located in the header of a packet can be an elimination of user action to use the beacons, e.g., a user may not configure packets for communication, format packets, or pair devices.

In one example, the hub 212 can securely communicate the asset data and/or the management data to the server 214 (such as a cloud-based server) which can store the asset data and/or the management data. In one example, the server 214 can time stamp when the data is received at the server 214.

In one example, the server 214 can include a representational state transfer (REST) application program interface (API) web interface to enable applications to retrieve and present the asset data and/or management data to users. For example, an application can include a user interface with a map of a facility. In this example, the application can access the asset data and/or management data and determine the locations of one or more assets in the facility. In this example, the application can display the locations of the asset to a user. In another example, the application can query or search the asset data and/or management data to determine user requested data, such as location information of an asset, usage information of an asset, and so forth.

In one example, the hub 212 can communicate identification information of the hub 212 (hub ID) with the asset data and/or the management data and communicate the hub ID and the asset data and/or the management data to the server 214. In another example, the server 214 and/or an application can receive and analyze the data using an analysis engine and then communicate the analyzed data to a database, where the database can store the analyzed data.

In one example, the asset data and/or the management data can be communicated and stored in packets. In another example, the server 214 and/or the application can filter and/or remove data when the data is analyzed. In another example, the database can filter and/or remove portions of the analyzed data. For example, the server 214, the application, and/or the database can remove the UUID from the asset data and/or the management data. In another example, the server 214, the application, and/or the database can aggregate the asset data and/or the management data.

The asset and management data can also include a power level.

Embodiments of the AMS 200 can track a variety of different types of assets. The assets that can be tracked can include hard assets and soft assets. In one example, the AMS can be used in a medical environment, such as a hospital, a nursing home, or medical clinic. In this example, the hard assets can include: medical devices, medical carts, containers, carriers, beds, physical records, etc. In another example, the soft assets can include: medical staff, visitors, patients, managers, other personnel or soft assets.

The tag 208 and/or the beacons 204 and 206, as discussed in the preceding paragraphs can be associated with different types of assets, including: hard assets, soft assets, and fixed assets.

Further examples of a hard asset can include a tangible and physical item or object, such as medical carts, intravenous (IV) poles; ventilators, tablets, medical devices, batteries, battery packs, power chargers, carts, computing tablets, all in one (AIO) personal computers (PCs), and so forth and so forth. The hard asset can be associated or coupled with a tag or a beacon. In one example, the tag can receive location information from a beacon, associate asset information with the location information, and send the information to a hub.

Further examples of a soft asset can include human resources, such as patients, doctors, janitor, family members, or relatives. In another example, the soft asset can be information, including: epidemic information, such as tracking information of individuals that come in contact with an infectious diseases; locations of individuals; patient information, such as medication prescriptions or treatment protocol; doctor's treatment or patient notes; facial recognition, such as patient tagging information using facial recognition; individual's security level access information; and so forth. The soft asset can be associated or coupled with a tag or a beacon. In one example, the tag can receive location information from a beacon, associate asset information with the location information, and send the information to a hub or server.

Further examples of a hard asset can include a fixed location, such as: a room in a facility, a floor of a building, a location of a building in an industrial park, a geographic location, and so forth. In another example, the hard asset can be a movable or variable location, such as a make-shift military post or a forward operating post. The fixed asset can be associated or coupled with a tag or a beacon. In one example, the tag can receive location information from a beacon, associate asset information with the location information, and send the information to a hub.

In some embodiments of the AMS, the location of a first asset (such as a hard asset, a soft asset, and/or a fixed asset) can be determined based on a location of a tag or beacon associated with the first asset relative to a tag or beacon associated with a second asset. For example, a location of a patient room can be coupled to a first tag or beacon and designated as a fixed asset within a hospital building. A medical cart can be coupled to a second tag or beacon and designated as a hard asset. To determine the location of the hard asset, a processing device, such as a server, can determine a location of the hard asset relative to the fixed asset by determining a location of the first tag or beacon relative to the second tag or beacon. In this example, the location of the patient room can be predetermined and associated with the first tag or beacon. The processing device can correlate the location of the medical cart relative to the patient room to determine the location of the medical cart within the medical facility by correlating the location of the first tag or beacon relative to the second tag or beacon.

In one example, fixed assets can be within threshold distances of each other such that asset tags or location ID beacons can have overlapping signals. For example, a first patient room in a hospital can be associated with a first location ID beacon and a second patient room next door to the first patient room can be associated with a second location ID beacon. The first location ID beacon and the second location ID beacon can each transmit a signal with a unique beacon ID. When the first location ID beacon may be within a threshold distance of the second location ID beacon, a first signal from the first location ID beacon can interfere with a second signal from the second location ID beacon. When a hard asset or soft asset is within a threshold distance of the first location ID beacon and the second location ID beacon, the hard asset or soft asset may receive the first and the second signal and have difficultly determining when the hard asset or soft asset is located in the first patient room or the second patient room. In one example, the first location ID beacon can communicate with the second location ID beacon to determine when the first signal may be interfering with the second signal. In this example, when the first signal may be interfering with the second signal, the first location ID beacon and/or the second location ID beacon can reduce a transmission signal strength of the to reduce or eliminate the interference between the first signal and the second signal. In another example, the hard asset or soft asset can communicate a message to the first location ID beacon and/or the second location ID beacon to indicate the interference between the first signal and the second signal. The first location ID beacon and/or the second location ID beacon can self-adjust based on the message or the message can indicate a signal strength adjustment level for the first location ID beacon and/or the second location ID beacon.

In one example, to reduce ambiguity of a location of an asset when receiving multiple signal with different unique beacon IDs indicating that an asset may be in more than one location, the processing device (such as a server) that determines a location of an asset can filter location information of the asset based on a temporal constraint of the asset being able to move between a first location and a second location within a given period of time. For example, a hard asset may be located at a first location. When the hard asset may be moving (such as a medical cart moved from a current patient's room to a new patient's room), the processing device can track a location of the hard asset by receiving different unique beacon IDs associated with different locations. Where the assets are located at different location and may communicate information at different signal strengths, an asset tag coupled to the hard asset may receive multiple unique beacon IDs from different location ID beacons. It filter out false positives for the location of the hard asset, the processing device can determine a distance, speed, and/or direction the asset is probable or capable of moving within a threshold period of time. When the hard asset receives a unique beacon ID from a location ID beacon that is at a distance that exceeds the distance the hard asset can travel within the threshold period of time, the processing device can filter out that unique beacon ID when determining a location of the hard asset.

In another example, to reduce ambiguity of a location of an asset, a fixed asset can have multiple location ID beacons. In one example, an obstruction can be located between a location ID beacon and an asset tag, where the object can interfere with the asset tag receiving the unique beacon ID from the location ID beacon. In this example, the asset can be at a first location, such as a first patient's room in a hospital. The first location can have a location ID beacon to communicate location information to the asset. When the communication path between asset tag and the location ID beacon may not be obstructed, the asset tag can indicate an accurate location of the asset. When the communication path between asset tag and the location ID beacon may be obstructed, the asset tag may not indicate an accurate location of the asset. For example, a second location, such a second patient room, may be adjacent the first location. The second location can have a different location ID beacon communicating a unique beacon ID. When the asset may be in the first location, but the communication path between the location ID beacon and the asset tag may be obstructed, the asset tag may not receive a unique beacon ID from the location ID beacon in the first location and may receive a unique beacon ID from the second location. In this example, although the asset may be located in the first location, where the asset tag receives the unique beacon ID for the second location, the processing device may erroneously determine that the asset is located at the second location. To avoid or reduce an erroneous location determination, the first location may have multiple location ID beacons located at different areas or points within the first location. The multiple location ID beacons at the different points can provide spatial diversity to reduce erroneous location determinations based on obstructions in communication paths.

Referring again to FIG. 2, the illustrated embodiment of the server 214 can process asset information and/or management information received from the hub 212 to determine asset results and management results. For example, the server 214 can receive battery usage information for an asset and can determine a trend in the amount of time a battery of an asset may be used, an estimated remaining battery life, any errors for the battery, and so forth. In another example, the server 214 can aggregate information received from a plurality of assets. For example, the server 214 can receive location information for a plurality of assets and can determine which assets may be used on a regular basis and which assets may not be used regularly. In another example, the server 214 can aggregate the asset information and/or management information to determine an overall health of the assets in the system, such as a level of outstanding repairs needed or the remaining life of the assets in the system.

The server 108 can provide a user with a cloud or web based portal to access information from different devices and/or different databases. The databases can include a hard asset database and a soft asset database. In one example, the hard asset database can include location information, asset health status information, workflow or asset utilization information, and so forth. In another example, the soft asset database can include location information, nurse notifications, vital sign information, medical information, physiological information, and so forth.

In one example, the server 214 can communicate different types of notifications to a user, including a 911 notification (e.g., broadcast high alert information) and a 411 notification (e.g., information communicated upon request).

In one example, the first beacon 204 can broadcast a signal such as a location ID to any device located with the room 202. In this example, when the tag 208 receives the location ID from the first beacon 204, the tag 208 can determine its location. In another example, the tag 208 can measure a received signal strength indication (RSSI) from the first beacon 204 to determine a location of the tag 208 within a radius or area to which the first beacon 204 is designated. For example, the tag 208 can use the received location ID from the first beacon 204 to determine that the tag 208 and associated asset is located in an identified room 202. The tag 208 can also use the RSSI to determine a location of the tag 208 within the room 202, such as within a threshold location accuracy (e.g., within X distance from the first beacon 204). In one example, a room 202 can include multiple beacons. The tag 208 can receive multiple location IDs from the multiple beacons and use the RSSI of the different location IDs to determine the location of the tag 208 within the room 202. For example, the tag 208 can use the RSSI of the different location IDs to triangulate the location of the tag 208 and associate asset in the room 202. In another example, the beacons can be located at different locations. For example, the second beacon 206 can be located in a hallway 210, in a lobby, in a stairwell, in a room, in a parking lot, and so forth.

When the tag 208 determines its location, the tag 208 can communicate asset information (such as location information, asset management information, and so forth) to the hub 212. In one example, the hub 212 can be a device (such as a communication plate) mounted to a wall. In another example, the communication hub 106 can be integrated into a construction of a location. For example, the hub 212 can be integrated into a floor, ceiling, wall, and so forth of a facility. In another example, the hub 212 can be software on the server 214.

In one example, the hub 212 can be located at a different location than the room 202 of the first beacon 204 and the tag 208 (such as a central location on the floor where the device is located or a central location in the building where the device is located). When the hub 212 receives the asset information from the tag 208, the hub 212 can relay the information to a server 214. In one example, the hub 212 can receive information from different devices. When the hub 212 receives the information from the different devices, the hub 212 can aggregate the data and send the aggregated asset information to the server 214. One advantage of the tag 208 determining its location and sending the asset management information to the hub 212 can be to enable the beacons 204 and 206 to be small and low energy. For example, because the first beacon 204 broadcasts the location ID, the first beacon 204 can consume a small amount of power (such as a 1-2 mAh per day) and can be powered by a small battery for an extended period of time. The tag 208 can have a separate power supply that can be recharged more easily than the beacons 204 and 206. Another advantage of the tag 208 communicating the asset information can be that the tag 208 can select the information to be communicated to the hub 212 and communicate the information in real-time and directly to the hub 212 to reduce communication interference from a plurality of devices.

The AMS 200 can provide a number of advantages, including: increased asset tracking and/or management efficiency, cost reduction, improved patient care, increased staff productivity, patient and/or medical personnel tracking, reduced power consumption, reduced tracking system size, cross platform interoperability (such as interoperability between different devices and/or device operating system), and configurable output power.

An advantage of the AMS system 200 can be an efficient and low complexity installation in a facility. For example, where the first beacon 204, the second beacon 206, and/or the tag 208 can be powered by a battery and/or wireless induction charging, there is minimal installation for the AMS 200 for the beacons 204 and 206, the tag 208, and/or the hub 212. Additionally, the beacons 204 and 206, the tag 208, and/or the hub 212 can communicate wirelessly (e.g., without installing communication cables in a facility) to decrease installation complexity and increase system efficiency. The AMS 200 can be installed without disrupting regular activity or systems at a facility and may be configured to communicate using an existing network.

In one example, the AMS 200 can track assets in real-time or substantially real-time. For example, the tag 208 may continuously communicate asset and management information to the communication hub 212.

In another example, the AMS 200 can track assets on a periodic basis. For example, the tag 208 can communicate asset and management information to the hub 212 on a periodic basis. In another example, the hub 212 can communicate a request to the tag 208 to communicate the asset and management information. When the tag 208 receives the request, the tag 208 can communicate the asset and management information to the communication hub 212.

In one example, the AMS 200 can include a map of a facility where assets may be managed. In another example, an implementation system, which can include manual inspection and or software to determine a schematic or layout of the facility. In one example, software can be implemented to determine a schematic or layout of the facility using a predetermined architectural map or other facility maps. In another example, the software can provide a tool for a user to arrange a layout of the facility. For example, the software can provide a user with hallway objects, room objects, stairway objects, and so forth that the user can arrange to approximate the layout of the facility. In one example, the software can receive information from an input device defining directions (such as north, south, east, and west) on a layout map and placing (e.g., "drag and drop") the hallway objects, room objects, stairway objects, and so forth on the layout map relative to the defined directions and/or relative to each other. In another example, the software can display an initial floor plan of a facility and the software can receive information from an input device placing or overlaying the hallway objects, room objects, stairway objects, and so forth on top of the initial floor plan.

In another example, a user can use a scanner, such as a 3 dimensional (3D) scanner and walk around the facility collecting layout information, where the software can use the information from the scanner to determine the layout of the facility.

Returning again to FIG. 2, when the layout of the facility has been determined, the beacons 204 and 206, and/or the hub 212 can be associated with the layout of the facility. For example, the beacons 204 and 206 and/or the hub 212 in a facility may be given a unique ID. When the facility layout is determined, the software can receive input from an input device (such as a mouse, a keyboard, a stylus, a touch screen, and so forth) associating the different unique IDs with location on the facility layout. In another example, locations in the facility layout can have unique IDs associated with the location. Unique IDs may be assigned at varying levels of specificity. For example, a unique ID may be assigned for a room 202. In another example, a unique ID may be assigned for a certain wing or group of rooms such as a trauma unit or neonatal unit. In a further example, a unique ID may be assigned for a floor, building, group of buildings, etc. In one example, a device with a corresponding tag (such as a scanner or a communication device) can be taken to one or more locations in a facility, where the location ID can be selected, the tag 208 of the device can scan or communicate with the local beacons 204 and 206 and/or the hub 212. The beacons 204 and 206 and/or the hub 212 can be associated with the location ID. In another example, when a tagged device is located at a facility location, the tag 208 can scan the location for the beacons 204 and 206 and/or the hub 212 (such as by using by using Bluetooth scanning) and associate the beacons 204 and 206 and/or the hub 212 scanned in the location with a location ID. For example, a user can walk into a room 202 with a first location ID, use a device with a tag 208 to manually or automatically scan the room 202 for the beacons 204 and 206 and/or the hub 212, and the beacons 204 and 206 and/or the hub 212 detected by the tag 208 may be associated with the first location ID. The user can repeat this process for multiple locations in the facility.

An advantage of the implementation system can be to enable integration of the AMS system 200 into a preexisting facility, e.g., the AMS system 200 may be installed in a preexisting facility and the implementation system can map the preexisting facility. Another advantage of the AMS system 200 can be that the installation and implementation of the AMS system can enable quick and efficient installation as the AMS system 200 can be installed and configured for a facility without invasively installing an asset management system. Another advantage of the AMS system 200 can be that the system can avoid interference by other devices by using the implementation system to determine optimal locations of the beacons 204 and 206 and/or the hub 212.

In one example, the AMS 200 can be used in a hospital environment. In another example the AMS 200 can be used in a home care medical environment. In one example, AMS systems 200 can communicate with other AMS systems 200. For example, a first AMS at a hospital and a second AMS can be located at a patient's home. This example, asset data and/or management data can be communicated between the AMS system at the hospital and the AMS system and the patient's home.

In another example, beacons, tags, and hubs can be located at different facilities such as a hospital and a patient's home. In this example, asset data and/or management data can be communicated to a server from the hubs at the different facilities. In another example, asset data and/or management data can be relayed from tags and/or hubs at a first location (such as a hospital) via the server 214 to another tag and/or hub at a second location (such as a patient's home). For example, medical information received at a tag at the hospital can be relayed to family members via the server 214 to another tag at the patient's home. In another example, a GUI can be a cloud-based interface that enables users to access tag, asset, and asset management data at any location that the cloud can be accessed (e.g., at a location with wireless or cellular network coverage).

In one example, software updates or patches can be communicated from the server 108 to communication hubs 106, assets 104, and/or location ID beacons 102.

To track assets, the AMS system 200 can use unique asset tags that can be associated with an asset. In one example, a Bluetooth technology, such as a Bluetooth low energy (BLE) technology can be used to tag assets in the AMS system 200. For example, a BLE-based beacon can be associated with an asset in the AMS system 200 and used to communicate asset and/or management information corresponding to the asset.

An asset can have one or more operational capabilities. The operational capabilities can include central, peripheral, broadcaster, and observer capabilities. In one example, a peripheral capability can be power saving capability (such as a sleep mode) where the peripheral device may periodically send data to a central device. An example of a Peripheral device is a BLE enabled blood pressure cuff that sends data periodically to a doctor or nurse's smartphone (the Central or gateway device) that then sends this data up to the cloud server.

A central asset can be a device with data processing capabilities and/or can provide a gateway to cloud or Internet based services.

In some embodiments, communication between the components of the AMS 200 may provide or incorporate security measures. For example, a password or code may be applied to transmissions. Other measures such as a code that is periodically refreshed or modified (such as a rotating security code (RSA code) may be implemented. In some examples, a beacon may apply a security measure to a broadcast signal. A local tag may need to have the proper response or stored code to decode, detect, or interpret the broadcast from the beacon. In other examples, the beacons and/or tags may be secured to prevent accidental or intentional reprogramming of the stored location information. In one example, a clock time can be synced up with the server periodically to provide a pseudo-random number that may be used to secure the AMS.

In some embodiments, the AMS can be compatible with a plurality of different devices. In one example, the devices in the AMS can use a common or similar/compatible operating system and data format to facilitate direct communicate with other devices in the AMS and/or with the server in the AMS.

Figure 3:
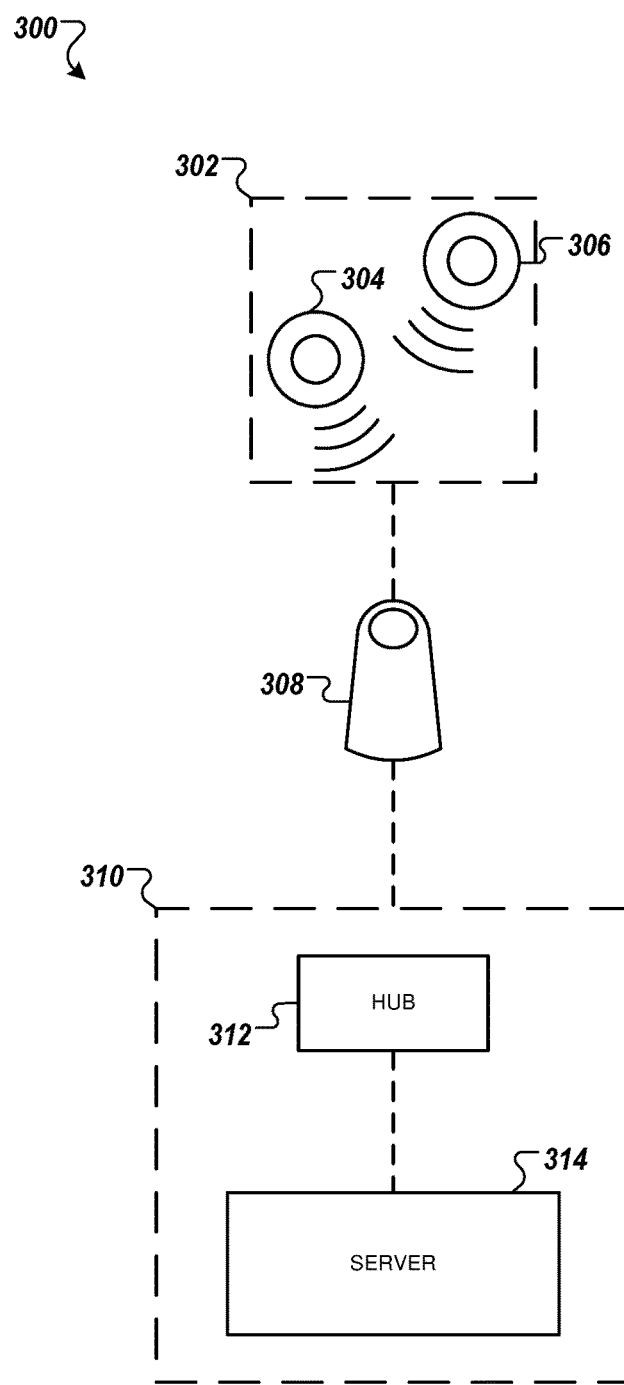
FIG. 3 illustrates a block diagram of one embodiment of a communication structure for asset tracking and management according to one embodiment.

FIG. 3 illustrates a block diagram of one embodiment of a communication structure for asset tracking and management according to one embodiment. The illustrated embodiment includes a sender 302, a tag 308, and a receiver 310. The illustrated example of the sender 302 includes a first beacon 304 and a second beacon 306. The beacons 304 and 306 are similar to those described above. In one example, the sender 302 sends a signal to the tag 308. The signal may be a broadcast or advertisement that is provided within an effective range. The signal may also be generated by the sender in response to a request or prompt from the tag 308 or some other device. The signal may also be generated based on a preset or dynamic timing or on other criteria. In another example, the sender 302 may include a single beacon. The sender 302 may also include other devices or plurality mixture of device types.

The illustrated embodiment also includes the receiver 310. The example of the receiver includes a hub 312 and a server 314. The hub 312 and server 314 may be similar to those examples described above. Another example of the receiver 310 may include a single device to receive the signal sent from the tag 308. The receiver 310 may interpret the signal from the tag 308 to determine a location of the tag 308 and thereby the location of the associate asset.

FIG. 4 illustrates one embodiment of a broadcast of a beacon. As a preliminary note, in one example, the beacon can use a generic attribute profile (GATT) framework, such as a GATT framework built on top of an attribute Protocol, to configure advertising parameters of a BLE profile according to one embodiment. A GATT framework can be a framework for a beacon signal (also referred to as a broadcast or advertisement) optimized for low power consumption. The beacon may be a GATT Server and/or a GATT client. In one example, when the beacon is in a server mode, the beacon can offer one or more services. In another example, the one or more services can include read services, write services, notify services, broadcast services, and so forth. In another example, a tag can be a GATT Client that can connect to the beacon in a Server mode, and the tag can consume the services of the beacon.

FIG. 4 illustrates an example packet according to one embodiment. In the illustrated embodiment, the packet can be 47 bytes in length and can include: preamble bytes; access address bytes, (for example the access address can be 0x8E89BED6 for advertisement communication channels or for data channels the access address can be different for different connections); advertising channel payload data units (PDU) bytes, where the PDU can have a header (such as 2 bytes that can indicate a size of the payload and an asset type, e.g., whether the device supports connections, etc.) and a payload (such as up to 37 bytes); cyclic redundancy check (CRC) bytes. In one example, 6 bytes of the payload can be a media access control (MAC) address of the asset and the information can include 31 bytes.

In one example, the beacon signal format can include a fixed beacon prefix. In another example, the beacon format packet can include a proximity UUID that can be an identifier to distinguish between signals communicated from the beacons and signals communicated from other devices. In one example, a tag or other device can scan for signals with a UUID designated for signals communicated from the beacons. In another example, the tag or other device can scan for beacons with specific manufacturing information and/or names designated for signals communicated from the beacons.

A signal from a beacon can include a major number or ID and/or a minor number or ID. In one example, the major ID is used to group a related set of beacons. The major number can be 2 bytes, such as 0x0049 or 73. In another example, signals from the beacon store can include the same major ID. In one example, the major ID can be associated with a beacon and a location of the beacon. In this example, an application at a tag can use the major ID of the beacon to determine a location of the tag and corresponding asset. The minor ID can be used to identify individual signals from a beacon. The minor ID can be 2 bytes, such as 0x000A or 10. In one example, signals communicated by a beacon can have different minor IDs and the minor IDs can be associated with a beacon and a location of the beacon. In this example, an application at a tag can use the minor ID of the beacon to determine a location of the tag.

A signal from a beacon can include a transmit power field. The transmit power field can indicate a transmit power of the beacon when the beacon communicates a signal or broadcast. In one example, the tag can use the transmit power field to determine a distance between the location ID beacon and the tagged asset. For example, the tag can determine a signal power of an advertisement received at the tag and compare the signal power with the transmit power field. The tag can determine a distance between the beacon and the tag by calculating the distance it would take for the transmit power to decrease to the power of the signal. In one example, the tag can determine the distance between the beacon and the tag within a range, such as near the beacon, far away from the beacon, or out of range of the beacon. In another example, the tag can determine the distance between the beacon and the tag as an actual distance (such as meters or feet). Although, the tag is described as determining the distances, in some embodiments, the distance is determined at a hub or server or other device separate or downstream from the tag and beacon.

In the example illustrated in FIG. 4, the advertising packet format can include an advertised beacon packet with a manufacturer specific data field. In another example, the advertising packet format can include a preamble, FA Address, PDU Header, and PDU Mac Address. FIG. 12 further illustrates that the advertising packet format can include a service data packet (see 0x16 in the table). In one example, the service data packet can add data to a device information service. In another example, the advertising packet format can include Company ID bytes. In another example, the advertising packet format may also include a device name (see bytes 2-5 in the table).

An example of the beacon packet structure is as follows:

| BYTE | DESCRIPTION | NOTE |
|---|---|---|
| 0 | Length in this profile | 0x02 |
| 1 | Type/Assigned Number | 0x01 = Flag |
| 2 | Flag: BR/EDR not supported | 0x04 = BLE_GAP_ADV_FLAG_BR_EDR_NOT_SUPPORTED |
| 3 | Length in this profile | 0x06 |
| 4 | Type/Assigned Number | 0x09 = Name |
| 5 to 9 | Application Name | "EmTag" |
| 10 | Length in this profile | 0x13 |
| 11 | Type/Assigned Number | 0xFF = Manufacturer data |
| 12 to 13 | Semiconductor ID | 0x59, 0x00 |
| 14 to 15 | Advertisement indicator | 0x02, 0x15 |
| 16 to 17 | First closest Minor ID | 2 bytes = detected beacons. |
| 18 | First closest RSSI | Radio strength received |
| 19 to 20 | Second closest Minor ID | 2 bytes = detected beacons. |
| 21 | Second closest RSSI | Radios strength received |
| 22 to 24 | Padding | 0x00, 0x00, 0x00 |
| 25 to 26 | This device's Major ID | Default = 0x0480 or 1152 |
| 27 to 28 | This device's Minor ID | Default = 0x03E9 or 1001 |
| 29 | This device's TX Power level | Default = 0 dBm (0x00) |

In one example illustrated, a tag sends out this advertisement approximately every 15 seconds for a 1 second window over 25 ms intervals. Data larger than 1 byte is transmitted in Big Endian (high byte first) or some other format or scheme.

If power drain becomes a concern, the advertisement time and interval may be shortened. For example, a tag signal may be as follows:

Tag Signal (Header) Packet Structure

| BYTE | DESCRIPTION | NOTE |
|---|---|---|
| 0 | Length in this profile | 0x02 |
| 1 | Type/Assigned Number | 0x01 = Flag |
| 2 | Flag: BR/EDR not supported | 0x04 = BLE_GAP_ADV_FLAG_BR_EDR_NOT_SUPPORTED |
| 3 | Length in this profile | 0x11 |
| 4 | Type | 0x07 = BLE_GAP_AD_TYPE_128BIT_SERVICE_UUID_COMPLETE |
| 5 to 20 | 0x1b, 0xc5, 0xd5, 0xa5, 0x02, 0x00, 0xbe, 0xa1, 0xe3, 0x11,0x6b, 0xed, 0x40, 0xfe, 0x0b, 0x31 | Service exposed to Central to be used for sending average values - of data collected from peer peripherals - as notifications. UUID 128: 310bfe40-ed6b-11e3-a1be-0002a5d5c51b |
| 21 | Length in this profile | 0x08 |
| 22 | Type | 0x09 = Name |
| 23-30 | 'E', 'N', 'O', 'V', 'A', 'T', 'E' | Single byte ascii characters - company name |

An example of the device listens for other beacon advertisements. It records the 2 closest beacon devices, based on radio strength, in the scan response packet. Before every scan, the Scan Response packet data is scrubbed to ensure data is not cached forever; only bytes 0 through 3 will be populated, the other bytes will be reset to 0x00.

At the above stage, the first detected beacon is not necessarily the closest beacon of the detected beacons.

Data larger than 1 byte is transmitted in Big Endian (high byte first) or another format or scheme.

A packet with sorting completed is shown below:

| BYTE | DESCRIPTION | NOTE |
|---|---|---|
| | Tag Advertisement Packet Structure | |
| 0 | Number of bytes in this GAP profile | May be hard-coded to max possible size 30. Max packet size may be 31. Byte 0 is may be used to state the length. |
| 1 | Type/Assigned Number | 0xFF = Manufacture Specific Data |
| 2 | Company ID (byte 2) | Company ID is a 2 byte. SIG ID may go here. |
| 3 | Company ID (byte 1) | |
| 4-5 | Major ID (byte 2) | Start of first closest detected beacon. Major ID is 2 bytes. |
| 6-7 | Minor ID (byte 2) | Minor ID is 2 bytes |
| 8 | Radio Strength | 2's complement of radio strength in dBm. Cast to (int8_t) to get the proper value. |
| 9 | Battery Level | Battery level 0-100% |
| 10-16 | Not used | Free space |
| 17-18 | Major ID (byte 2) | Start of second closest detected beacon. Major ID is 2 bytes. |
| 19-20 | Minor ID (byte 2) | Minor ID is 2 bytes |
| 21 | Radio Strength | 2's complement of radio strength in dBm. Cast to (int8_t) to get the proper value. |
| 22 | Battery Level | Battery level 0-100% |
| 23-29 | Not used | Free space |
| 30 | Scan Event Caught | Debugging tool If 0x00 Scan completed without finding anything. If 0x01 Scan completed, found a device and tried to add to packet. This helps identify that the scan event is catching devices. If a device that is not a beacon is found, it will not be added to the packet, but this byte will be set. The byte is set because a BLE_GAP_EVT_ADV_REPORT has been caught. This value may be reset (0x00) before scan. |

In one example, the beacons and tags may use a bootloader program with a user. In another example, the beacons and tags may use a bootloader program without the user of a bootloader. When a bootloader is not used. All relevant programs are completed and built into a hex file. In one example, hex files may be completed for a "soft" hex and an "application" hex files. These files may be merged into a single file using a merge program. The merged hex file may be formatted to provide compatibility with other devices and/or 3$^{rd}$ party devices/programs. The file can be used to program tags, beacons, hubs, and other devices.

In another example, a bootloader may be used as an additional input to supplement the merging function taking in the soft hex and application hex inputs. For example, the merge may take in a bootloader/dfu hex, softdevice hex, and application hex files. These files may be merged into a single file. The files may be merged in a single merge or may be merged in more than one execution. An example of the commands for merging is as follows:

Commands:

mergehex.exe --merge bootloader.hex softdevice.hex --output boot_soft.hex mergehex.exe --merge boot_soft.hex bootloader_settings.hex -output boot_soft_settings.hex mergehex.exe --merge boot_soft_settings.hex app.hex --output production.hex where:
  bootloader.hex
    Hex file of bootloader
  softdevice.hex
    Hex file of soft device
  boot_soft.hex
    Merged hex file of bootloader and softdevice hex files.
  bootloader_settings.hex
    Special file required to set bank_0 to 0x01 and bank_0_crc to 0x00. See here for details: https://devzone.nordicsemi.com/question/15081/how-to-flash-the-softdevice-the-bootloader-and-the-application-at-once/O
    The file is included but for reference, but just in case this is the contents of the hex file (just text file with .hex extension):
:020000040003F7
:08FC0000010000000000000FB
:00000001FF
  boot_soft_settings.hex
    Merged hex file of the bootloader, softdevice, and bootloader setting hex files.
  app.hex
    Hex file of application
  production.hex
    Final hex file with everything merged.

In some examples, the commands may be run in multiple iterations. For example:

mergehex.exe --merge c:\HexFiles\bootloader.hex c:\HexFiles\s130_nrf51822_0.9.0-1.alpha_softdevice.hex --output c:\HexFiles\boot_soft.hex mergehex.exe --merge c:\HexFiles\boot_soft.hex c:\HexFiles\bootloader_settings.hex --output c:\HexFiles\boot_soft_settings.hex mergehex.exe --merge c:\HexFiles\boot_soft_settings.hex c:\HexFiles\app.hex --output c:\HexFiles\production.hex Further preparation of the beacons, tags, and/or hubs may include flashing the devices to provide the above described functionality or fewer or more operations to provide less or more functionality.

Figure 5:
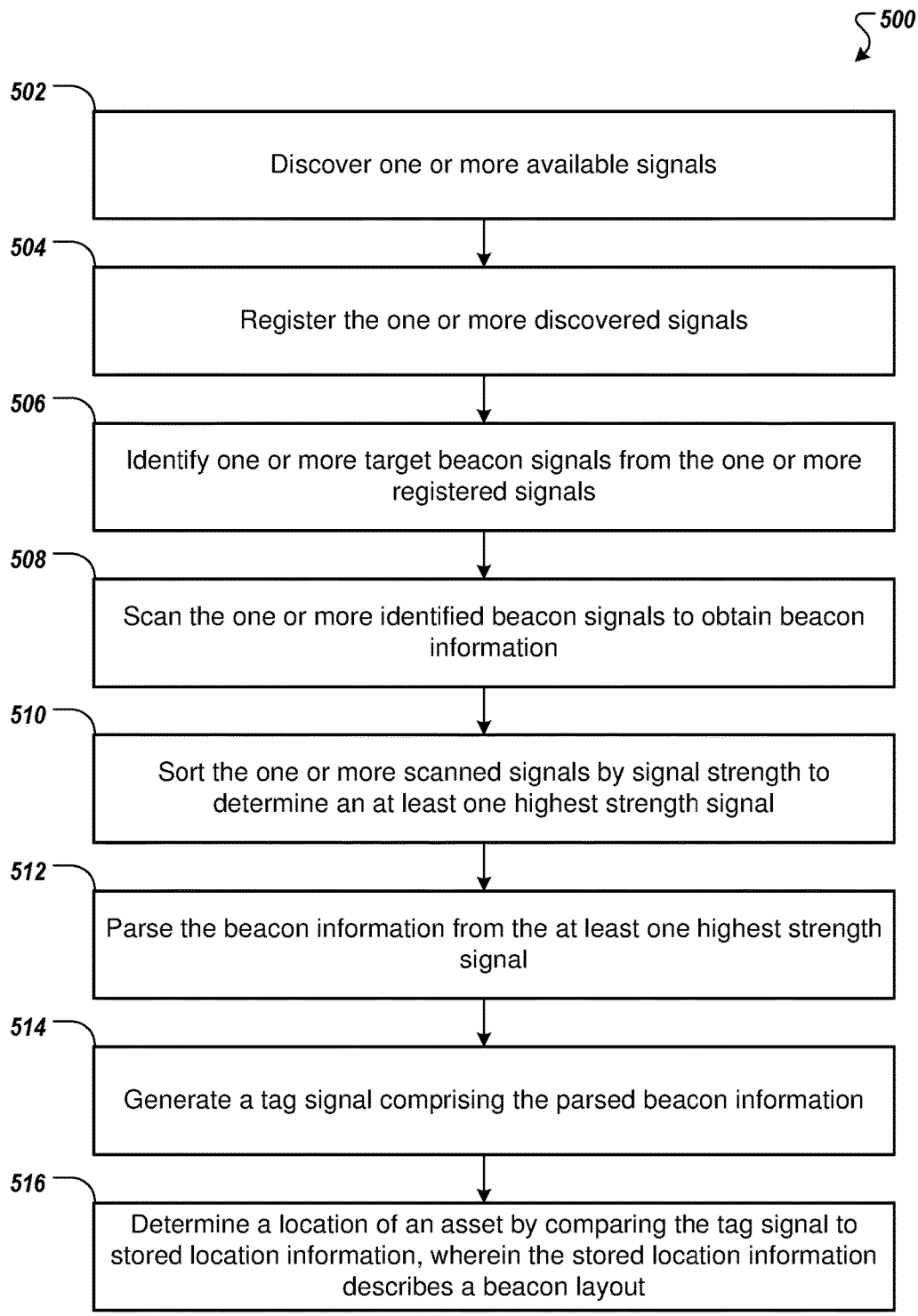
FIG. 5 illustrates a flowchart of an asset tracking and management system according to one embodiment.

FIG. 5 illustrates a flowchart 500 of one embodiment of an asset tracking and management system. At block 502, one or more available signals are discovered. At block 504, the one or more discovered signals are registered. At block 506, one or more target beacon signals are identified from the one or more registered signals. At block 508, the one or more identified beacon signals are scanned to obtain beacon information. At block 510, the one or more scanned signals are sorted by signal strength to determine an at least one highest strength signal. At block 512, the beacon information is parsed from the at least one highest strength signal. At block 514, a tag signal comprising the parsed beacon information is generated. At block 516, a location of an asset is determined by comparing the tag signal to stored location information. The stored location information describes a beacon layout. Other methods may be executed in conjunction with the examples discussed herein. Other methods may include fewer or more functions to perform less or more functionality.

Figure 6:
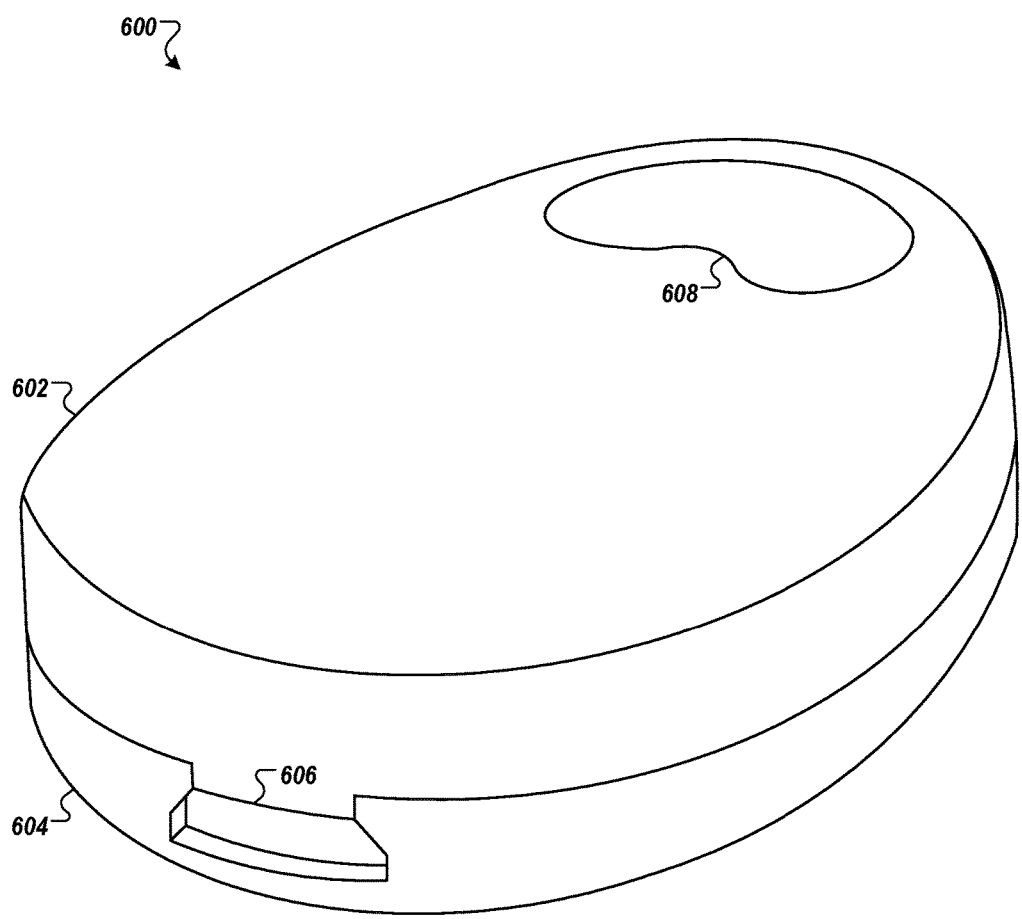
FIG. 6 illustrates a perspective view of one embodiment of a tag according to one embodiment.

FIG. 6 illustrates a perspective view of one embodiment of a tag 600. The illustrated example includes a first housing portion 602 and a second housing portion 604. The first housing portion 602 and the second housing portion 604 may be plastic, metal, composite, or another material. The two portions 602 and 604 may be joined by mechanical forces, chemical bonding, thermal coupling, or in another manner. The two housing portions 602 and 604 may have surface features to provide aesthetic or functional characteristics. For example, one or both of the housing portions 602 and 604 may include a company logo or individual tag name or number to identify the source of the tag 600 or the tag 600 itself. The housing portions 602 and 604 may include a surface feature to improve grip or remove sharp edges for safety. The housing portions 602 and 604 may be separable to allow for separation to maintain the tag 600. For example, the housings 602 and 604 or part of the housings 602 and 604 may be removable to allow for a battery change or component replacement. The housings 602 and 604 may also be permanently sealed to prevent tampering, provide intrusion prevention (dust proofing, water proofing, etc.). Other features may be included.

In the illustrated example, the tag 600 includes a port 606. The port 606 may facilitate charging or electrically connecting the tag 600 to a power source or processing device. The port 606 may facilitate one or more of a variety of different connections. The port may facilitate a connector which is proprietary or generic. In the illustrated example, one port 606 is included. In other examples, more than one port 606 may be included.

Tag 600 also includes an attachment point 608. The attachment point 608 facilitates connection of the tag 600 to another structure. The attachment point 608 may be a through-hole to allow for clipping the tag 600 to another structure, inserting a string or other tie or lanyard to manage the tag 600. The attachment point 608 may also be a magnetic point to facilitate magnetically coupling the tag 600 to a magnetic or metallic surface or structure. Examples of the attachment point 608 may include other structures or features of the tag 600 that facilitate connection of the tag 600 to another structure or enable a user to handle or manage the tag 600.

Figure 7:
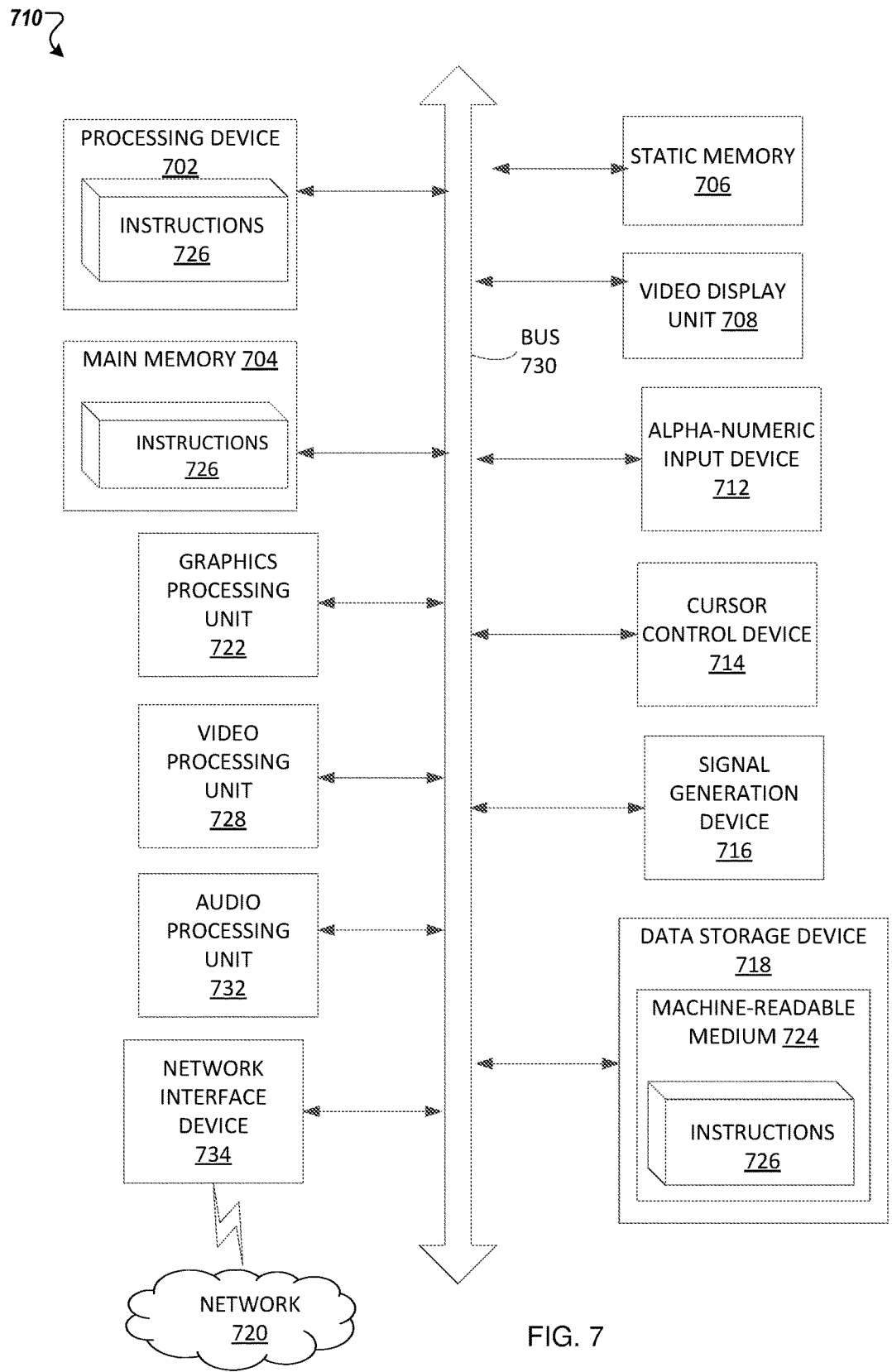
FIG. 7 illustrates a diagrammatic representation of a machine in the exemplary form of a computer system within which a set of instructions for causing the machine to perform any one or more of the methodologies.

FIG. 7 illustrates a diagrammatic representation of a machine in the exemplary form of a computer system 700 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 722. The computer system 700 also may include a video display unit 708 (e.g., a liquid crystal display (LCD), a cathode ray tube (CRT), or a touch screen), an alphanumeric input device 710 (e.g., a keyboard), a cursor control device 714 (e.g., a mouse), and a signal generation device 716 (e.g., a speaker).

The data storage device 718 may include a machine-readable storage medium 724 on which is stored one or more sets of instructions 726 (e.g., software) embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting computer-readable storage media. The instructions 726 may further be transmitted or received over a network 720 via the network interface device 734.

While the machine-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" can also be taken to include any medium that is capable of storing, encoding or carrying a set of instructions for execution by the machine and that cause the machine to perform any one or more of the methodologies of the present disclosure. The term "computer-readable storage medium" can accordingly be taken to include, but not be limited to, solid-state memories, optical media, and magnetic media.

In the foregoing description, numerous details are set forth. It can be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those that may use physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations can be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    discovering one or more available signals to obtain discovered signals;
    registering the one or more discovered signals;
    identifying one or more target beacon signals from the one or more registered signals to obtain one or more identified beacon signals;
    scanning the one or more identified beacon signals to obtain beacon information;
    sorting the one or more scanned signals by signal strength to determine an at least one highest strength signal;
    parsing the beacon information from the at least one highest strength signal;
    generating a tag signal comprising the parsed beacon information; and
    determining a location of an asset by comparing the tag signal to stored location information, wherein the stored location information describes a beacon layout.

2. The method of claim 1, wherein identifying the one or more target beacon signals comprises ignoring a non-beacon signal from the one or more registered signals.

3. The method of claim 1, wherein the parsed beacon information comprises a major identifier and a minor identifier parsed from the at least one highest strength signal.

4. The method of claim 3, further comprising storing the major identifier and the minor identifier to a tag local memory device.

5. The method of claim 4, further comprising resetting at least a portion of the tag local memory to facilitate storing a new major identifier and a new minor identifier to the tag local memory device.

6. The method of claim 1, wherein the tag signal comprises the parsed beacon information ordered by signal strength.

7. The method of claim 1, wherein the tag signal comprises signal strength information associated with the parsed beacon information.

8. The method of claim 1, wherein discovering the one or more available signals occurs periodically at a rate between 500 milliseconds and 2 seconds.

9. The method of claim 1, wherein at least one of the tag signal and the one or more target beacon signals comprises a personal area network signal.

10. The method of claim 1, further comprising:
    sending the tag signal to a local hub;
    receiving the tag signal at the local hub;
    formatting the tag signal at the local hub;
    transmitting the formatted tag signal to a central location;
    receiving the formatted tag signal at the central location; and
    analyzing the tag signal to identify the asset and determine a power level of at least one of a beacon and a tag associated with the asset.

11. An asset tag device comprising:
    a housing;
    a battery disposed within the housing;
    a circuit board disposed within the housing and in electrical communication with the battery, wherein the circuit board comprises:
    a local memory;
    a transceiver to:
        detect local signals to obtain detected local signals; and
        transmit a response packet;

a processor to:
- identify the detected local signals;
- determine whether the detected local signals comprise at least one beacon signal;
- store, to the local memory, the at least one beacon signal;
- sort, in the local memory, the stored at least one beacon signal by proximity to the asset tag device;
- parse the sorted at least one beacon signal; and
- append tag information to the parsed at least one beacon signal to generate the response packet.

12. The asset tag device of claim 11, wherein the processor is further to identify and extract a major identifier and minor identifier from the sorted at least one beacon signal.

13. The asset tag device of claim 11, wherein the tag information comprises battery power level information.

14. The asset tag device of claim 11, wherein the transceiver is to detect and transmit a personal area network signal.

* * * * *